United States Patent [19]

Sember et al.

[11] 3,800,674
[45] Apr. 2, 1974

[54] HYDRAULIC COUPLING

[75] Inventors: Joseph Alexander Sember, Glendale; Clyde Robert Porter, West Los Angeles, both of Calif.

[73] Assignee: P. L. Porter Co., Los Angeles, Calif.

[22] Filed: Nov. 25, 1969

[21] Appl. No.: 879,805

[52] U.S. Cl. .......................... 92/48, 92/97, 92/128, 60/579, 60/533, 285/74
[51] Int. Cl. ..... F01b 19/00, F01b 29/00, F15b 7/00
[58] Field of Search ............. 92/48, 97, 128, 49, 62; 60/54.6 R; 285/74

[56] References Cited
UNITED STATES PATENTS

| | | | |
|---|---|---|---|
| 3,572,217 | 3/1971 | Corry | 92/48 |
| 3,126,879 | 3/1969 | Canfield | 92/48 |

Primary Examiner—Edgar W. Geoghegan
Assistant Examiner—A. M. Zupcic
Attorney, Agent, or Firm—Smyth, Roston and Pavitt

[57] ABSTRACT

A coupling for an hydraulic signal transmission system comprising a male and female portion, each having a plunger actuated diaphragm therein. An O-ring detent is utilized to maintain one of the plungers within its housing and the other plunger may be maintained within its housing by means of a shoulder abutment structure. The male and female housings are maintained in the linked position by means of a quickly releasable spring clip apparatus.

14 Claims, 5 Drawing Figures

INVENTORS:
Joseph A. Sember
Clyde R. Porter

ATTORNEYS

INVENTORS:
Joseph A. Sember
Clyde R. Porter

ATTORNEYS

HYDRAULIC COUPLING

BACKGROUND OF THE INVENTION

This invention relates to a coupling unit which may be installed in the transmission line of an hydraulic system to transmit a signal from one point to another for remote control or actuation of a controlled apparatus. Such system might comprise a control unit and a remote operating unit which are operatively interconnected by a line containing hydraulic fluid. The hydraulic fluid is not transmitted from one point to another, but when a pressure is exerted upon the fluid at the control unit, a like pressure is exerted on the remote operating unit since the pressure is transmitted through the fluid.

Such hydraulic systems can be used in a large variety of applications and have been found to be particularly useful when installed in the assemblies which control the hydraulic locking devices in airplane seats. An example of such an hydraulic system has been fully disclosed in U.S. Pat. No. 3,173,263, issued Mar. 16, 1965, and assigned to the assignee hereof.

In airplane seats, the inclinable backrest is normally fixed in an upright position. If the seat occupant desires to tilt the backrest to some selected angle, he mainpulates a control member, such as a push button on the arm of the chair, and then leans back against the backrest to tilt it. When he actuates the control members, he increases the pressure in such an hydraulic system as that described in the above cited patent, causing the transmission of a signal to an hydraulic locking device.

Generally, an hydraulic locking device releasably holds the backrest at any selected angle of inclination; it comprises a cylinder and a piston which divides the cylinder into two hydraulic locking chambers. A normally closed locking valve controls flow between the two locking chambers. When the control member or push button is actuated, a signal is transmitted to the remote operating unit, opening the locking valve and allowing fluid to flow between the two locking chambers in the cylinder.

Installation and maintenance of such hydraulic systems in airplane seats is often difficult due to the limited space available and also due to the fact that the hydraulic line from the control mechanism must be snaked through the arm of the seat structure for connection to the hydraulic lock.

During installation and repair, the hydraulic fluid must be injected into or removed from many of such systems after the structural components have been put into place. Any hydraulic fluid lost during these operations is not only wasteful but also potentially damaging to the surrounding equipment.

SUMMARY OF THE INVENTION

The present invention provides a coupling for use in the hydraulic line between the control unit and the remote operating unit. Basically, the coupling is a device which senses an increase in pressure at the control unit and mechanically transmits a force through the coupling in response to it. The mechanically transmitted force is then retranslated into an hydraulic pressure which is transmitted to the remote operating unit. Two mating halves of the coupling are each provided with pistons which are in abutment for the mechanical force transmittal when the coupling is closed.

As an added feature, the invention provides a spring clip device which fixes the coupling members in the mated position, but which may easily be released so as to open the coupling.

The invention allows an hydraulic line to be broken at an intermediate point between a control unit and a remote operating unit without loss of hydraulic fluid or any prepressurization which may have been manufactured into the system. Installation of the device is simplified in that less difficulty is encountered in snaking the hydraulic line through a seat structure, for example. Installation and maintenance are both simplified in that the parts can be installed and removed with the fluid in the hydraulic system, obviating the danger of leakage or loss.

An added advantage of the invention is that, when repair is necessary, less time and labor are required for removal of only those structural elements which must be repaired, since the amount of disassembly necessary is greatly diminished.

Other advantages of the invention will become obvious to those skilled in the art by reference to the detailed description and accompanying drawings, which illustrate what is presently considered to be a preferred embodiment of one mode contemplated for utilizing the novel principles set forth in the claims.

DETAILED DESCRIPTION

Figure 1:
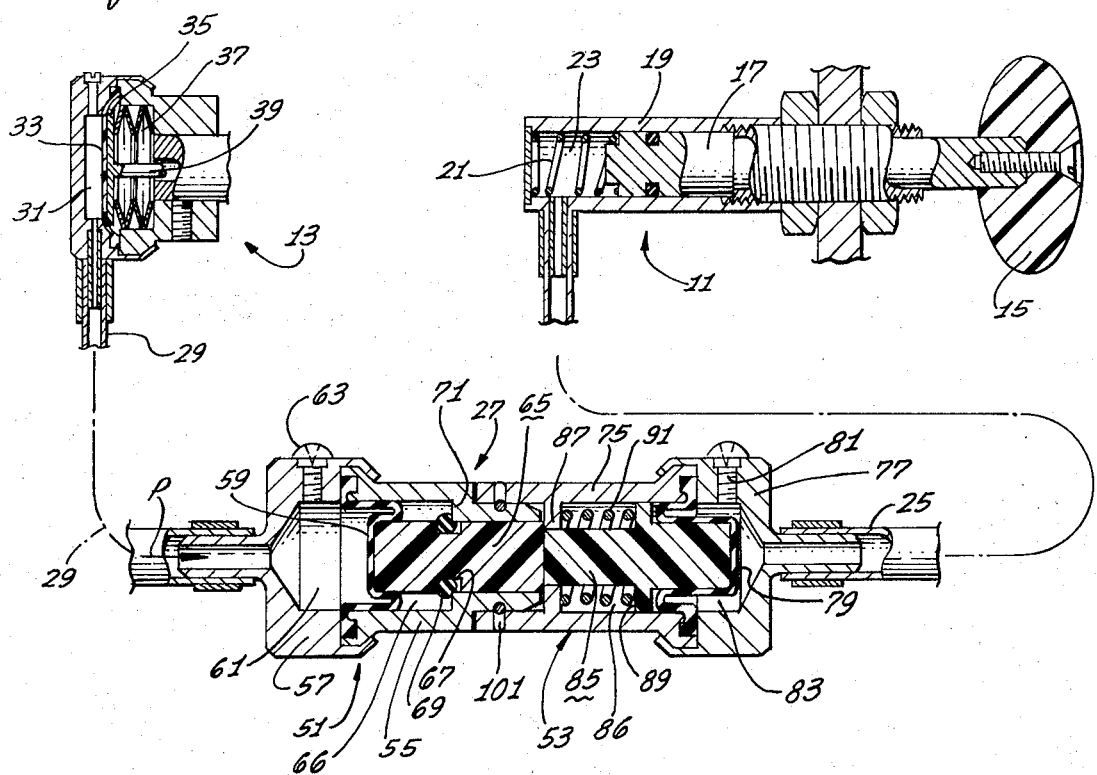
FIG. 1 is a sectional view of an hydraulic coupling embodying the principles of the present invention, illustrating the coupling as positioned within a remote control system.

Referring now to FIG. 1, there is shown a control unit generally illustrated at 11 which, when actuated, transmits a control signal to a remote operating unit 13. The control mechanism 11 and the remote operating unit 13 are completely described in U.S. Pat. No. 3,173,263, issued Mar. 16, 1965 and assigned to the assignee hereof. In general, however, the control mechanism 11 comprises an operator actuated knob 15 for shifting a piston 17 within a cylinder 19 against a confined hydraulic fluid and a spring 21 within a chamber 23.

The pressure of the fluid in chamber 23 is transmitted, via a line 25, a coupling 27, and a line 29 to a chamber 31 in the remote operating unit 13. The increase in pressure in chamber 31 serves to actuate a diaphragm 33 and a rigid metal disk 35, against the force of one or more Bellville springs 37, to motivate an operating rod 39 which acts to open a normally closed locking valve in an hydraulic lock (not shown).

Figure 2:
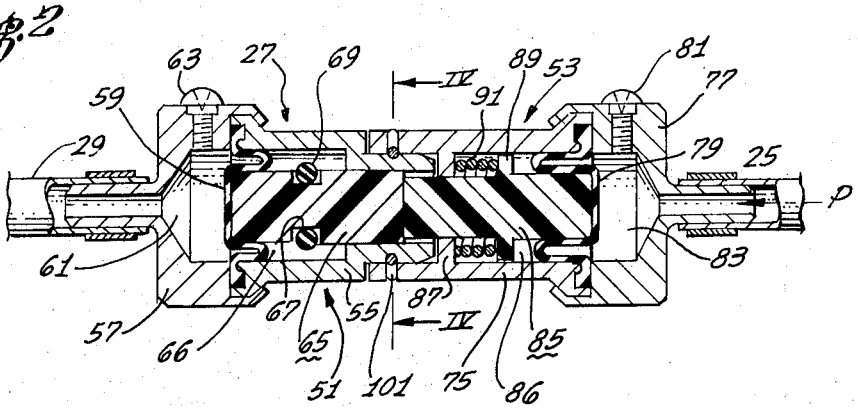
FIG. 2 is a view of the coupling similar to that illustrated in FIG. 1, showing the signal transmission structure of the coupling in a second operating position thereof.
Figure 3:
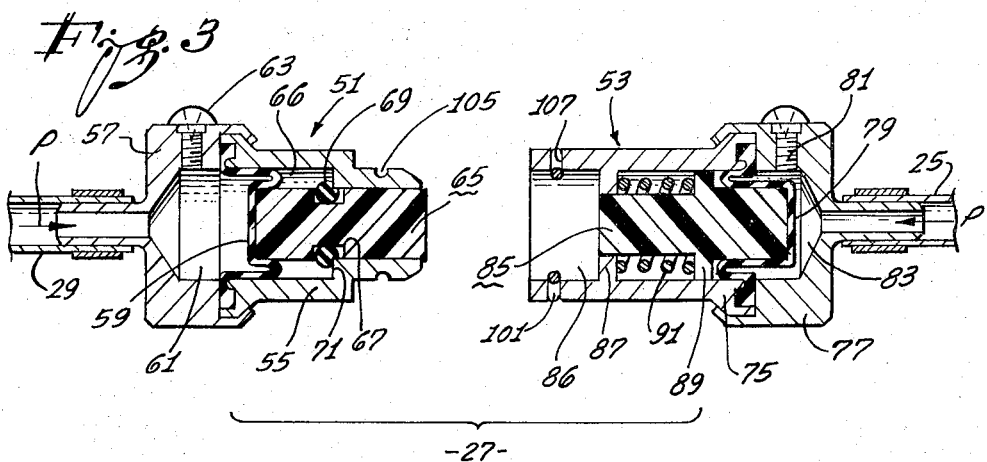
FIG. 3 is a sectional view of the coupling in an uncoupled mode thereof.

Now, with reference to FIGS. 1–3, the coupling 27 is seen to comprise a male coupling member 51 which fits within a female coupling member 53. The male section 51 comprises a first portion 55 which fits within a second portion 57, a diaphragm 59 being firmly fixed between the two portions. A fluid chamber or compartment 61, formed on one side of the diaphragm 59, and which may be filled by means of an opening which is normally sealed by a screw 63, is in communication with the transmission line 29. A plunger 65 is slidably mounted in a compartment 66 within the portion 55 such that it is in contact with the diaphragm 59 on the side thereof opposite the fluid chamber 61; it is provided with a circumferential groove 67 which carries an O-ring 69. As shown in FIGS. 1 and 3, the O-ring 69 cooperates with a shoulder 71 of the portion 55 so as to maintain plunger 65 therein when the coupling is open, as shown in FIG. 3.

Use of the O-ring 69 on plunger 65 provides assembly capabilities which would otherwise be unavailable. When coupling member 51 is assembled initially, plunger 65 is not installed within the compartment 66. The member is attached to the unit 13 via line 29 and fluid is placed in compartment 61, line 29, and compartment 31 by means of the opening normally sealed by fill screw 63. O-ring 69 is then placed within groove 67 and the plunger is inserted into the compartment, deforming the O-ring until it passes the shoulder 71. If necessary the open end of compartment may be chamfered to facilitate the initial deformation of the ring.

After ring 69 passes shoulder 71, it resumes its normal shape and serves as a retainer or detent to hold the plunger in the compartment against the pressure it has now created in the chambers 31 and 61 and the line 29.

Although both coupling members could be manufactured to utilize this structure, another form has been shown for member 53 to provide another illustration of the inventive concepts herein.

Referring now to the female member 53 of the coupling, a first portion 75 is inserted within a second portion 77, and a flexible diaphragm 79 is firmly fastened therebetween. A fill screw 81 in section 77 serves to seal an opening and can be removed to allow fluid to be placed within a fluid compartment 83 which is in communication with hydraulic line 25.

A plunger 85 is mounted in a compartment 86 on the side of diaphragm 79 opposite the fluid compartment 83, and, as shown in FIGS. 1 and 2, it extends through an internal flange 87 in the portion 75 to abut the plunger 65 of member 51. A shoulder 89 on the plunger 85 serves to cooperate with the internal flange 87 to maintain plunger 85 within the coupling portion 53. When the members 51 and 53 are uncoupled, if it is desired to maintain the pressure in line 25 at the level normally carried therein when the actuator member 15 is not actuated, a spring 91 may be positioned between the flange 87 and the shoulder 89 so as to maintain the relative position of the parts shown in FIGS. 1 and 3.

In operation, when member 15 is actuated, pressure is exerted within compartment 23, line 25, and compartment 83, causing diaphragm 79 and plunger 85 to move to the left from the position shown in FIG. 1 to that shown in FIG. 2. The movement of plunger 85 causes a similar movement of plunger 65 so that diaphragm 59 exerts a pressure on the fluid and compartment 61, line 29, and compartment 31, causing diaphragm 33, plate 35 and rod 39 to move to the right from the position shown in FIG. 1. When the actuation of member 15 ceases, the structure returns to the respective positions illustrated in FIG. 1.

If it is desired to ensure that no force is transmitted from the remote operating unit 13 to the control mechanism 11 which could damage it, the plunger 65 can be manufactured so as to be of such diameter that it contacts internal flange 87, as shown in FIG. 1, and is then restrained from forcing piston 85 to the right, as shown in the drawings. Thus, the coupling 27 serves to allow full transmission of force from the control unit to the remove operating unit, while allowing only a limited transmission of force in the reverse direction.

Although the coupling portions 51 and 53 can be maintained in the mated position by any suitable means, it is preferable that the structure utilized be quickly and easily attached and removed. For this reason, a releasable means has been illustrated to interlock the two telescoping coupling members 51 and 53 with a snap action when the portions are moved together.

Figure 4:
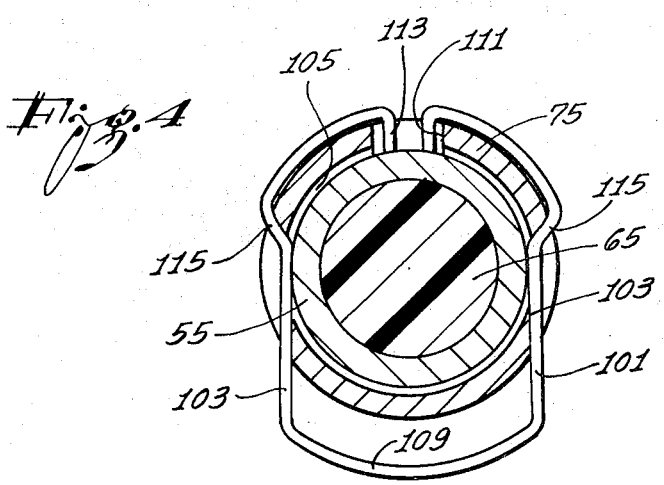
FIGS. 4 and 5 illustrate, in the closed and opened positions respectively, the locking mechanism which maintains the sections of the coupling in a coupled relationship, as viewed along a line IV—IV of FIG. 2.
Figure 5:
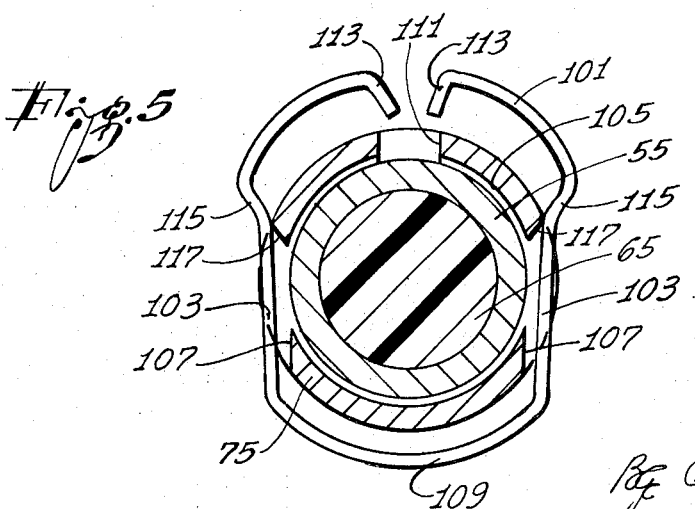

Referring to FIG. 4, a wire spring 101 having two arms 103 straddles the female member 75 for releasable engagement with a circumferential groove 105 in the male member 51. The two arms 103 of the spring extend into two partially circumferential slots 107 in the coupling member 53. The arms are connected by a central, outwardly bowed section 109 which, when depressed, allows the spring to be shifted from the position shown in FIG. 4 to that shown in FIG. 5. Retention of the spring on the coupling is provided for by a peripheral recess or radial opening 111 into which hook-ends 113 of the arms 103 are inserted when the spring is positioned on the coupling.

When a radially directed force is exerted on section 109 of the spring, portions 115 of the arms 103 are forced radially outwardly by cam sections 117 in the slots 107. This causes the spring to be removed from the groove 105 and the coupling members can then be separated. When the coupling is reassembled, the portions are merely mated and a radially directed force is exerted near the hooked sections 113 of the spring, returning it to the position shown in FIG. 4.

Thus, the applicants have provided one embodiment of a new and improved concept in the art of couplings utilized in hydraulic signal transmission systems. Other modifications and alterations will be obvious to those skilled in the art.

What is claimed as the invention is:
1. An hydraulic coupling comprising
  a first member having
    a first compartment in communication with
    a first fluid line,
    a second compartment having
      a first actuating means movably mounted therein, and
    means separating said first and second compartments and allowing a variation of the volumes thereof in response to movement of said first actuating means thereagainst,
  a second member having
    a third compartment in communication with a second fluid line,
    a fourth compartment having
      a second actuating means movably mounted therein, and
    means separating said third and fourth compartments and allowing a variation of the volumes thereof in response to movement of said second actuating means thereagainst, means on said first and second members for maintaining said first and second actuating means in cooperating relationship so that movement of one of said actuating means results in an identical movement of the other of said actuating means, and means in said fourth compartment forming a positive stop which limits the travel in one direction of said first actuating means in said second compartment.

2. The hydraulic coupling of claim 1 including means on said second actuating means cooperating with said stop means to limit the travel in one direction of said second actuating means in said fourth compartment.

3. The hydraulic coupling of claim 2 including means acting between said stop means and said travel limiting means on said second actuating means for resisting a pressure force in said third compartment tending to motivate said second actuating means.

4. An hydraulic coupling for use in a system for transmitting a signal from a first apparatus to a second apparatus comprising a first member having
first fluid actuated means therein,
a second member having
second fluid actuating means therein which are positioned so as to be powered by said first fluid actuated means,
detent means for maintaining at least one of said fluid actuating means within its respective member when said first and second members are uncoupled, and
means in one of said first and second members for allowing the transmission of a signal through said coupling in only one direction.

5. An hydraulic coupling for use in a system for transmitting a signal from a first apparatus to a second apparatus comprising a first member having
first fluid actuated means therein,
a second member having
second fluid actuating means therein which are positioned so as to be powered by said first fluid actuated means,
detent means for maintaining at least one of said fluid actuating means within its respective member when said first and second members are uncoupled,
an external groove in one of said members,
a partial circumferential groove in the other of said members, and
spring clip means cooperating with said grooves to maintain said members in coupled relationship.

6. The coupling of claim 5 wherein said spring clip means includes a quick release and fastening means thereon.

7. An hydraulic coupling comprising a first member having
a first compartment in communication with a first fluid line,
a second open-ended compartment having
a first actuating means movably mounted therein, and
means separating said first and second compartments and allowing a variation of the volumes thereof in response to a change of fluid pressure in said first compartment,
a second member having
a third compartment in communication with a second fluid line,
an open-ended fourth compartment having
a second actuating means movably mounted therein, and
means separating said third and fourth compartments and allowing a variation of the volumes thereof in response to movement of said second actuating member thereagainst,
means for maintaining said first and second members i relative positions such that the open ends of said second and fourth compartments are located so as to maintain said first and second actuating members in an abutting relationship, and
means for positively retaining said first and second actuating means within said second and fourth compartments, thereby facilitating easy separation and reconnection of said hydraulic coupling without loss of fluid from either said first or second fluid line.

8. An hydrauilc coupling for use in a system for transmitting a signal from a first apparatus to a second apparatus comprising a signal transmitting member having
fluid actuated means therein and extending therefrom,
a signal receiving member having
fluid actuating means therein and extending therefrom, and
means for releasably attaching said signal transmitting member to said signal receiving member with said fluid actuated means and said fluid actuating means in abutment with one another for signal transmission therebetween.

9. A quick-disconnect type device for allowing the separation of portions of an hydraulic pressure line without loss of fluid therefrom comprising:

a first member having
a pressure responsive means extending therefrom, a second member having
a pressure generating means extending therefrom, means for maintaining said pressure responsive means and said pressure generating means in abutment with one another for transmission of a pressure signal therebetween, and means for allowing quick separation and reconnection of said first and second members so as to withdraw said pressure responsive means and said pressure generating means from their abutting relationship.

10. In an hydraulic system a first hydraulic line,
means for generating a pressure in hydraulic fluid within said first hydraulic line at one end thereof, means for sealing the other end of said hydraulic line including
means responsive to pressure generated by said generating means to assume a predetermined position within said sealing means in accordance with pressure generated within said first line, a second hydraulic line, means at one end of said second hydraulic line for exerting a force in response to pressure within said second hydraulic line, means for sealing the other end of said second hydraulic line including means for generating a pressure in fluid within said second hydraulic line, and means for holding said pressure responsive means in said first line in operative relationship with said pressure generating means in said second line whereby operator-generated pressure created in said first line through said first line pressure generating means is transmitted via said first line, said first line pressure responsive means, said second line pressure generating means, and said second line to said force exerting means.

11. A quick-disconnect type coupling for hydraulic pressure to transmission lines comprising a first and a second housing, each having a first and a second chamber therein, means separating said first and second chambers in both of said housings, one of said chambers in each of said housings being a fluid receiving chamber, force transmission means mounted within the other of said chambers in each of said first and second housings, means for maintaining said force transmission means in each of said other chambers in abutment with one another, and means for quickly separating said force transmission means and said first and second housings.

12. A device for coupling a first pressure transmission conduit to a second pressure transmission conduit comprising:

a first hollow housing member having an opened end and a closed end, the closed end having a fluid port therein receiving said first pressure transmission conduit, a second hollow housing member having an opened end and a closed end, the closed end having a fluid port therein receiving said second pressure transmission conduit, said first and second housing members including means being releasably connected about a longitudinal axis to each other, the opened ends of the respective housing members being in facing relationship, an impermeable membrane including retaining means sealably positioned in each of said housing members intermediate the length thereof providing in each housing a closed fluid filled chamber having communication with said fluid port, and a piston longitudinally slidable within said connected first and second housing members and intermediate and contiguous with said membranes, the pressure in said closed chamber in said housing being imparted by said membrane therein to said piston and by longitudinal movement of said piston the same pressure is imparted by way of said membrane in the other of said housing to the said closed chamber therein.

13. A device for coupling a first pressure transmission conduit to a second transmission conduit according to claim 12 wherein said piston is comprised of a first and second portion, each piston portion having a forward and rearward end, one piston portion being slidably positioned in said first housing member and the other piston portion being slidably positioned in said second housing portion, said piston portions being contiguous at their forward ends and in axial alignment when said body members are connected, the rearward end of each engaging a said membrane.

14. A device for coupling a first pressure transmission conduit to a second pressure transmission conduit according to claim 13 including means of slidably and removably retaining said piston portions in said housing members.

* * * * *